Patented Mar. 16, 1948

2,437,869

UNITED STATES PATENT OFFICE 2,437,869

PHENANTHRIDINE DERIVATIVES

Leslie Percy Walls, Teddington, England, assignor to The Imperial Trust for the Encouragement of Scientific and Industrial Research, Westminster, England No Drawing. Application February 2, 1945, Serial No. 575,931. In Great Britain January 3, 1944

Section 1, Public Law 690, August 8, 1946
Patent expires January 3, 1964

3 Claims. (Cl. 260—286)

This invention is for improvements in or relating to the production of new phenanthridinium salts.

As a result of protracted research and experimentation, it has now been unexpectedly discovered that the hitherto unknown 2:7-diamino-9-phenylphenanthridine possesses, in the form of its quaternary salts, outstanding therapeutic properties. While these properties were quite unpredictable, it is possibly significant that the amino groups in the new compound are situated in the benzidine positions in relation to the diphenyl part of the structure and may be presumed to impart to the molecule special substantive properties in respect of natural issues. The new compound, for example, in the form of its quaternary methyl bromide or of the corresponding chloride, is very powerfully active in *Trypanosoma congolense* infections of cattle and has the valuable property of being generally curative in one dose which may be administered by the convenient subcutaneous route. It is also curative, though to a lesser degree, in the important infection of African cattle caused by the organism *T. brucei*.

According to the present invention, the new trypanocidal phenanthridinium salts are prepared from the corresponding 2:7-dinitro or 2:7-dicarbalkoxyamido phenanthridine compounds, which latter compounds are themselves obtainable in manner known per se by the cyclisation of substituted orthoxenylamines of the general formula:

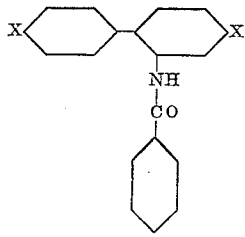

(where X represents a nitro group or a carbalkoxyamido group) in the presence of a pentavalent phosphorus compound.

The quaternary salts of the present invention possess the general formula:

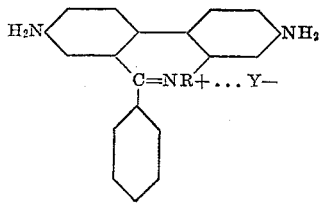

where R represents an alkyl or alalkyl group and Y represents the anion of an acid. Specific examples are the alkyl halides and sulphates, in particular 2:7-diamino-9-phenyl-10-methylphenanthridinium bromide and the corresponding chloride and methosulphate.

The process of the present invention may be effected by quaternating 2:7-dinitro-9-phenyl-phenanthridine as by subjecting that compound to the action of an alkylating agent known to be capable of forming a quaternary salt and reducing the quaternary salt thus formed by subjecting that salt to the action of a reducing agent capable of reducing a nitro group to an amino group. Alternatively, the dinitro-phenanthridine compound may be reduced by the action of a reducing agent capable of reducing a nitro group to an amino group and, preferably after protection of the amino groups, e. g. by acetylation, the resulting di-amino phenanthridine compound then quaternated as by treatment with an alkylating agent known to be capable of forming a quaternary salt. It will, of course, be understood that, when the intermediate amino compounds in the latter process have been protected as by acetylation, the process includes as a subsequent stage the conversion of the protecting groups into free amino groups; for example, in the case of acetylation, there is introduced a final stage of removal of the acetyl groups by hydrolysis, e. g. with hydrochloric acid. Of these two processes the first described, viz: quaternation followed by reduction, is preferred since it is more expeditious and results in a higher yield.

The process of the present invention may also be effected by substituting, for the aforesaid dinitro-phenanthridine compound, a corresponding di-carbalkoxyamido compound, for example, the corresponding dicarbethoxyamido compound obtainable by the cyclisation of 2-benzamido-4:4'-dicarbethoxyamidodiphenyl. In following this alternative mode of procedure, the step of reduction employed in the case of the dinitro compound is replaced by a step of hydrolysis.

The present invention is illustrated by the following non-limitative examples:

*Example I*

2-amino-4:4'-dinitrodiphenyl was prepared by the method of Finzi and Bellavita (Gazetta, 1938, 68, 77) from o-aminodiphenyl, or with a purer product from 2-amino-4'-nitrodiphenyl. Ten parts by weight of this substance were dissolved in 70 parts by volume of boiling chlorobenzene and treated with 4 parts by volume of benzoyl chloride. Ebullition was maintained until evolution of hydrogen chloride ceased, when on being cooled the solution deposited crystalline 2-benzamido-4:4'-dinitrodiphenyl in good yield. This acyl-derivative crystallised from glacial acetic acid or from nitrobenzene in small white needles M. P. 234° C.

The acyl derivative (12 parts by weight), phosphorus oxychloride (15 parts by volume) and nitrobenzene (30 parts by volume) were heated at 170–190° C. for 20 hours. On being decomposed by water the reaction mixture deposited 2:7-dinitro-9-phenylphenanthridine which crystallised from pyridine or nitrobenzene in pale yellow needles, M. P. 268° C., the yield being 45–55% of the theoretical. From the nitrobenzene mother liquors, unchanged acyl-derivative was recovered which may be cyclised by a further treatment with nitrobenzene-phosphorus oxychloride.

Alternatively, the condensation of 2-amino-4:4'-dinitrodiphenyl with benzoyl chloride or benzoic anhydride may be effected in nitrobenzene solution, so that the acyl-derivative need not be isolated, but may be cyclised in situ after subsequent addition of phosphorus oxychloride.

Quaternation was conveniently effected by heating 2:7-dinitro-9-phenylphenanthridine (10 parts by weight) with nitrobenzene (80 parts by volume) and methyl sulphate (6 parts by volume). Removal of the nitrobenzene by steam-distillation left an aqueous solution from which the quaternary methosulphate crystallised. When this solution was made alkaline a pseudo-base was precipitated as a red flocculent powder, which crystallised from acetone in small red prisms (decomposed at 186–188° C.). The pseudo-base dissolved in hot dilute hydrochloric acid and from the cooled solution the quaternary chloride crystallised, a salt which could also be obtained by salting out the aqueous solution of the methosulphate.

An aqueous solution of the quaternary chloride was boiled with iron powder until reduction of the nitro-groups was complete. The resulting permanganate-coloured aqueous liquor was separated from iron compounds and made just alkaline with ammonia. A small quantity of brownish by-product was precipitated and removed by filtration. The filtrate was neutralised by acid, and a suitable salt isolated from it by addition of potassium bromide; 2:7-diamino-9-phenyl-10-methylphenanthridinium bromide separated in almost black prisms, decomposing at 240° C., which were purple when viewed by transmitted light.

An alternative method of working up the product is as follows: after reduction the aqueous liquor when cold was filtered from iron compounds and treated with sufficient sulphuric acid to cause the acid sulphate to crystallise. This salt which occurs in ruby-red elongated prisms was isolated by filtration, dissolved in water, and the solution neutralised with ammonia and treated with sufficient potassium bromide, or other suitable bromide, to cause the crystallisation of the diaminoquaternary bromide. When the aqueous liquor from the cold reduction mixture was evaporated to dryness a purple-black gum was left as residue. On being boiled with alcohol this was converted into a mass of glistening purple-black plates of 2:7-diamino-9-phenyl-10-methylphenanthridinium chloride decomposing at 250° C. This salt is extremely soluble in water, but may be purified by recrystallisation from alcohol.

*Example II*

10 parts of 2-amino-4:4'-dicarbethoxyamidodiphenyl were condensed with 2.8 parts by volume benzoyl chloride by heating for 1 hr. in chlorobenzene (40 parts by volume). With cooling, the benzoyl compound separated, and was purified by crystallisation from ethyl acetate in white prisms (about 10 parts) of M. P. 147° C. Cyclisation of this product by one hour's heating with phosphorus oxychloride followed by decomposition of the reaction mixture cautiously with water, and crystallisation of the product from alcohol furnished 2:7-dicarbethoxy-amido-9-phenylphenanthridine, which could readily be quaternised in nitrobenzene at 160° C. by methyl sulphate, 2:7-dicarbethoxyamido-9-phenyl-10-methylphenanthridinium methosulphate crystallising out in theoretical yield; recrystallisation from alcohol afforded glistening yellow needles, M. P. (decomp.) 278° C. Hydrolysis by sulphuric acid, followed by neutralisation with ammonia and addition of potassium bromide furnished 2:7-diamino-9-phenyl-10-methylphenanthridinium bromide, of which the overall yield was very good.

I claim:
1. Quaternary 2:7-diamino-9-phenyl-10-alkyl phenanthridinium salts.
2. A new compound, 2:7-diamino-9-phenyl-10-methylphenanthridinium bromide which is soluble in water and has trypanocidal properties.
3. A new compound, 2:7-diamino-9-phenyl-10-methylphenanthridinium chloride which is soluble in water and has trypanocidal properties.

LESLIE PERCY WALLS.

REFERENCES CITED

The following references are of record in the file of this patent:

UNITED STATES PATENTS

| Number | Name | Date |
| --- | --- | --- |
| 2,176,889 | Christiansen | Oct. 24, 1939 |
| 2,267,988 | Morgan | Dec. 30, 1941 |

FOREIGN PATENTS

| Number | Country | Date |
| --- | --- | --- |
| 372,859 | Great Britain | May 19, 1932 |
| 511,353 | Great Britain | Aug. 17, 1939 |